US006889821B1

United States Patent
Walser

(10) Patent No.: US 6,889,821 B1
(45) Date of Patent: May 10, 2005

(54) ORIENTING AND SORTING DEVICE FOR CORN DOGS

(76) Inventor: Glenn E. Walser, 1034 Explorer, Duncanville, TX (US) 75137

( * ) Notice: Subject to any disclaimer, the term of this patent is extended or adjusted under 35 U.S.C. 154(b) by 0 days.

(21) Appl. No.: 10/339,481

(22) Filed: Jan. 9, 2003

(51) Int. Cl.⁷ .............................................. B65G 11/06
(52) U.S. Cl. ......................... 198/778; 198/416; 193/12; 193/46; 193/47
(58) Field of Search ................................ 198/383, 389, 198/416, 778; 193/12, 44–47

(56) References Cited

U.S. PATENT DOCUMENTS

| | | | | |
|---|---|---|---|---|
| 812,327 A | * | 2/1906 | Cranner | 453/9 |
| 1,846,941 A | * | 2/1932 | Bihl et al. | 221/279 |
| 1,892,206 A | * | 12/1932 | Dietz | 198/724 |
| 3,837,452 A | * | 9/1974 | Schuricht | 193/12 |

\* cited by examiner

Primary Examiner—Kathy Matecki
Assistant Examiner—Mark A. Deuble
(74) Attorney, Agent, or Firm—Thompson & Gustavson. L.L.P.

(57) ABSTRACT

An apparatus (10) is disclosed which incorporates a spiral slide (14) to orient corn dogs (12) in a single direction as they slide down the spiral slide. The oriented corn dogs (12) enter an inlet (66) of a first conveyor (16) as they leave the spiral slide. The first conveyor moves the corn dogs (12) along a direction (52) toward a second conveyor (18). The first and second conveyors are pivotally mounted at their distant ends so that their facing ends (64,70) can be aligned to allow a corn dog in one slot (50,52) of the first conveyor to be conveyed to any one of the slots (92–98) in the second conveyor (18) to group the corn dogs in sets for packaging.

13 Claims, 14 Drawing Sheets

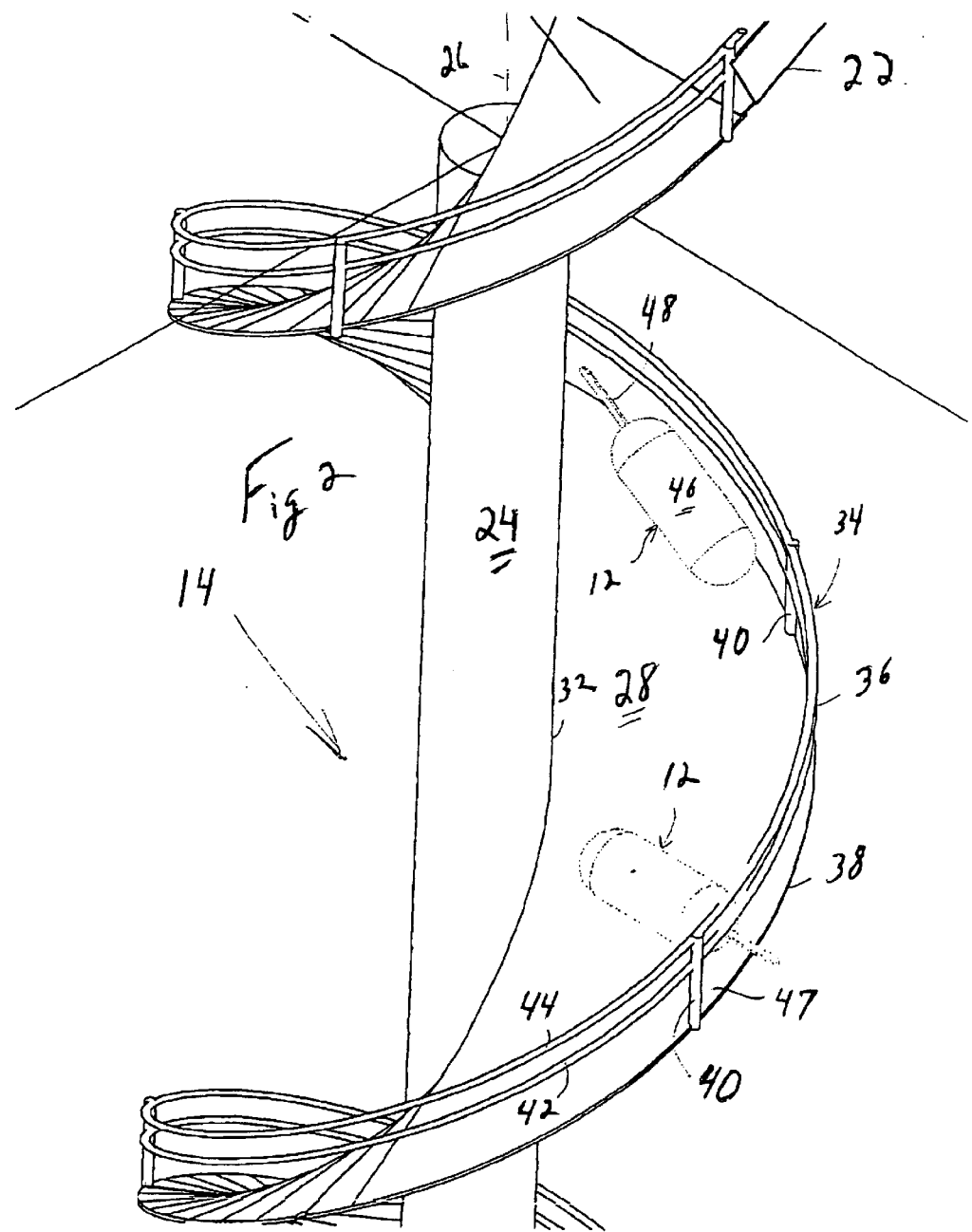

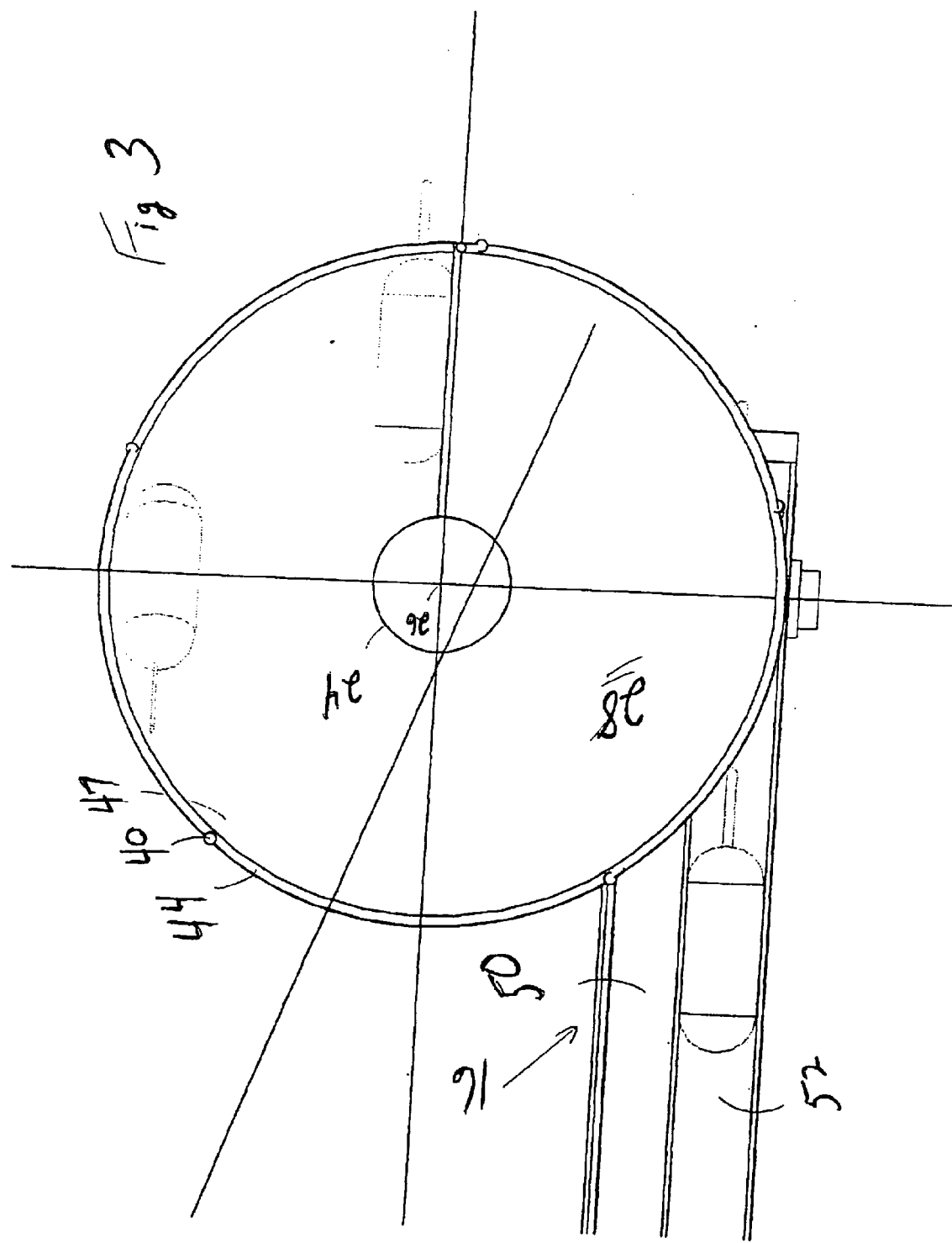

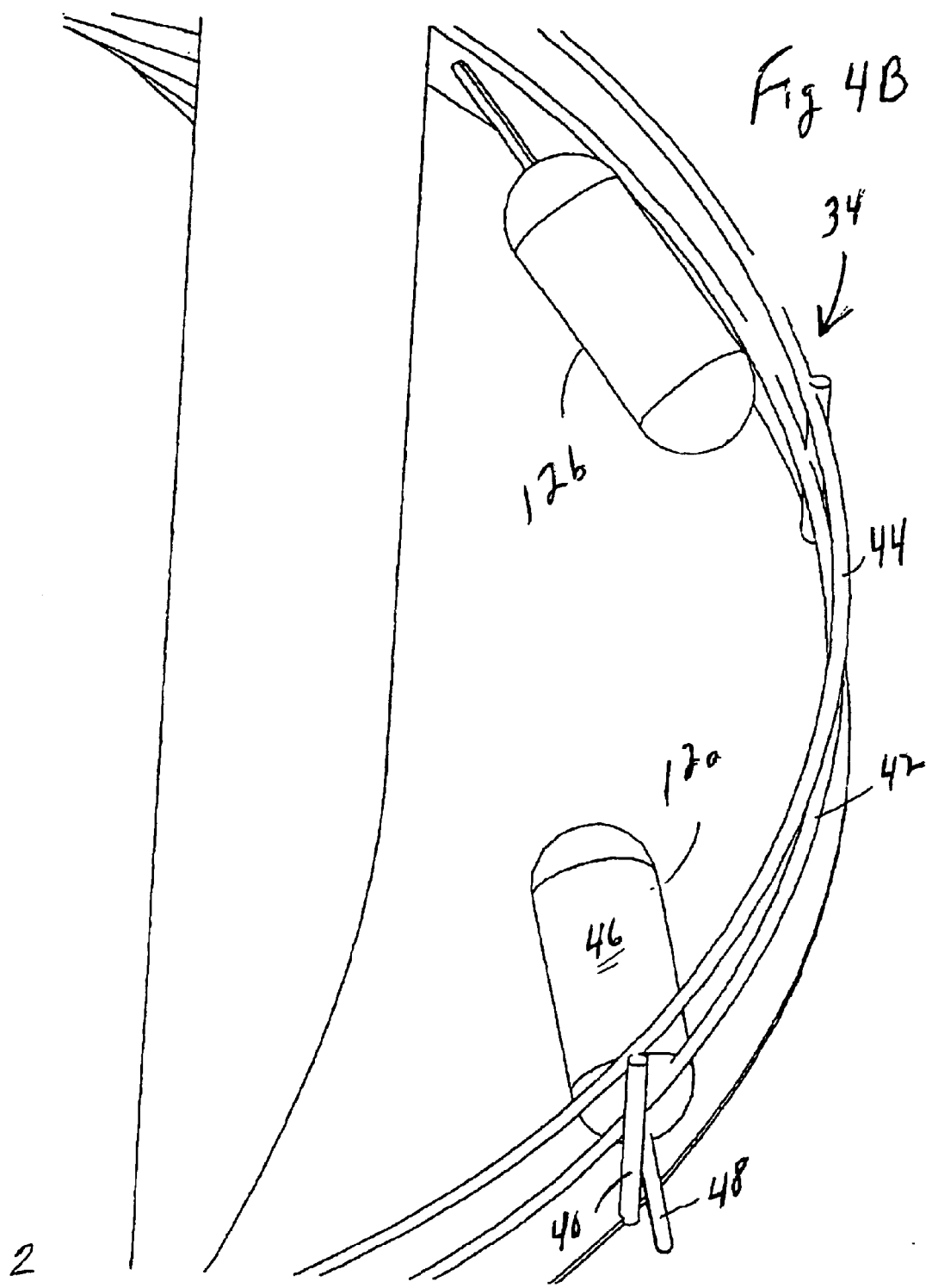

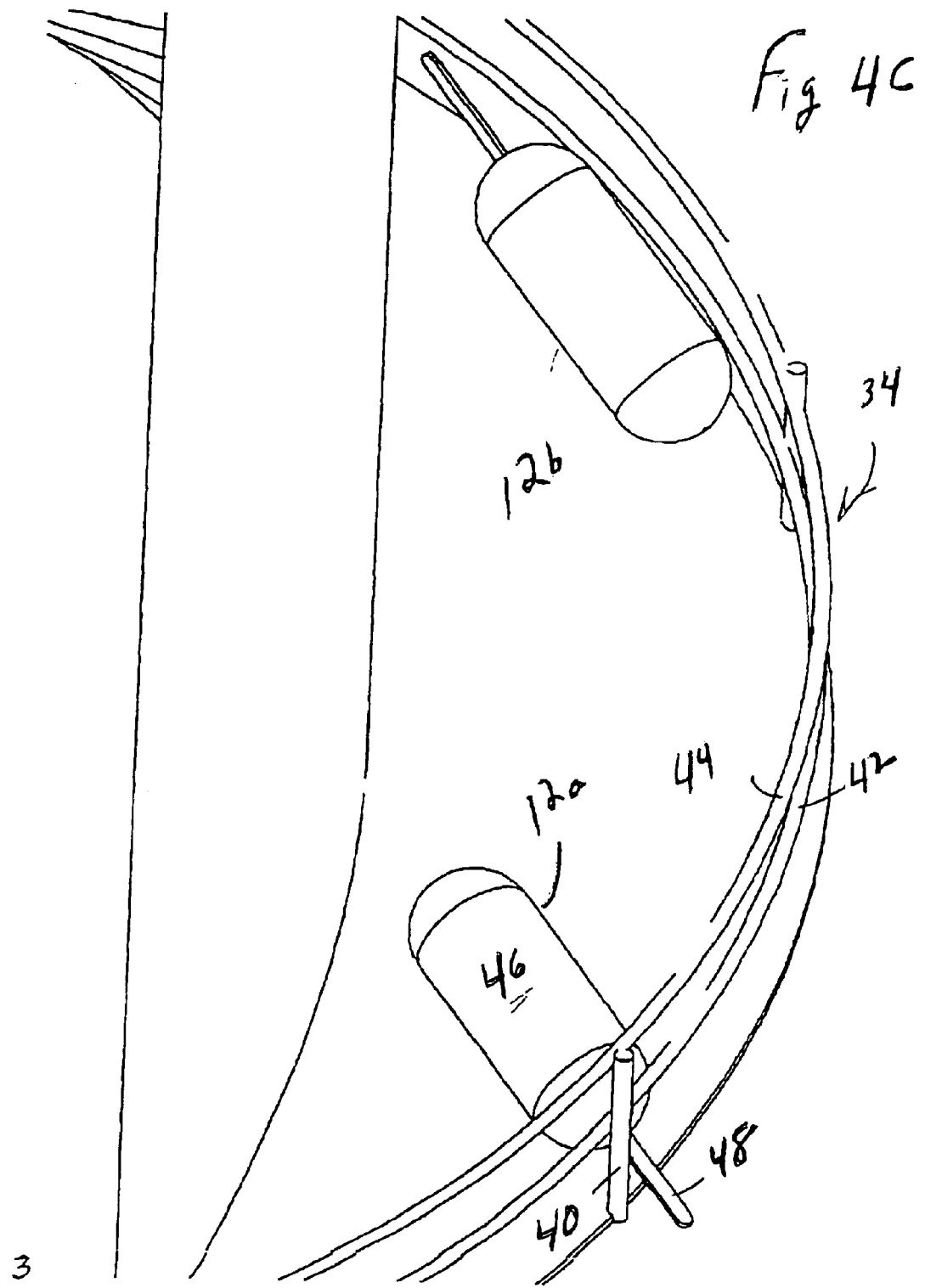

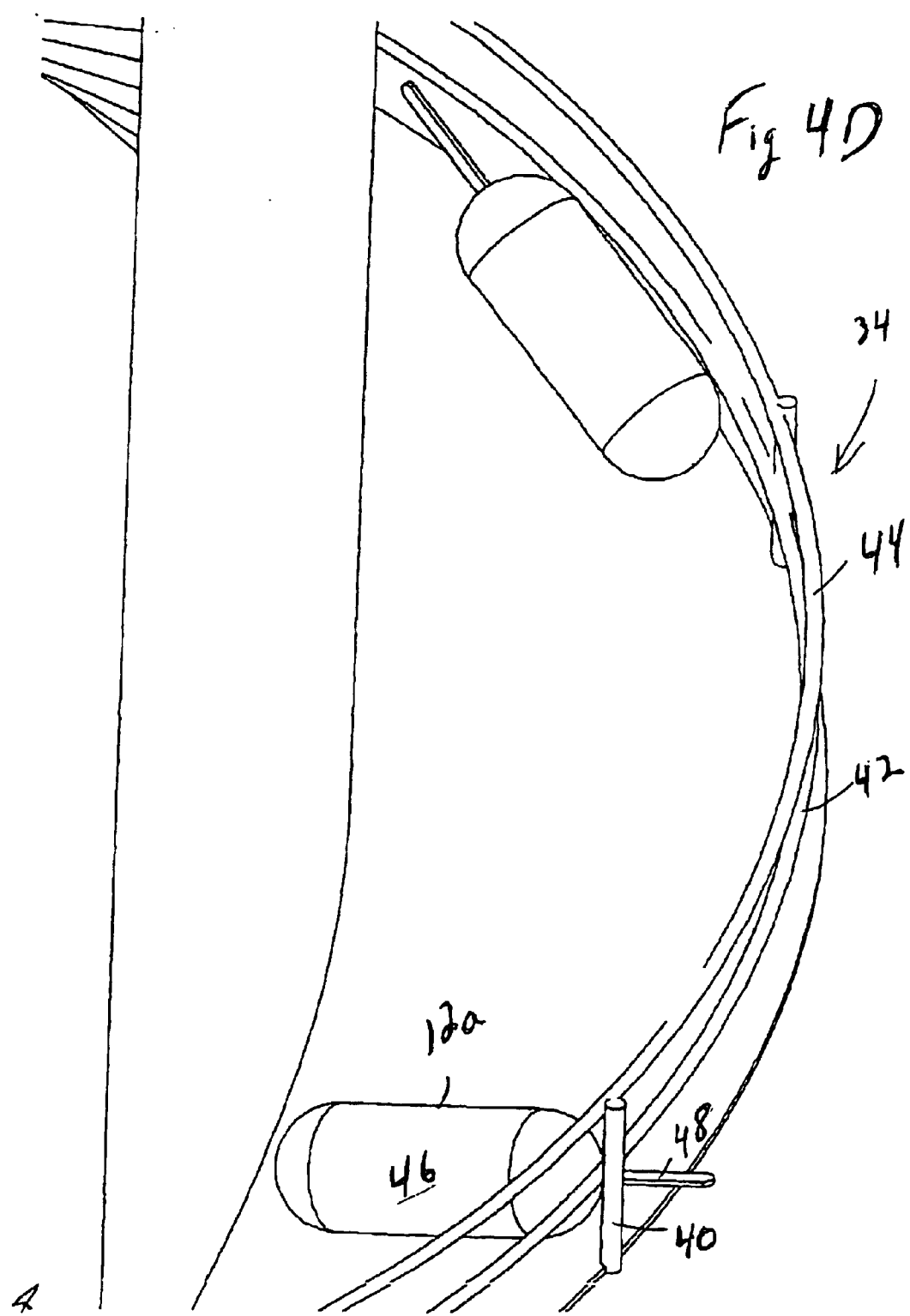

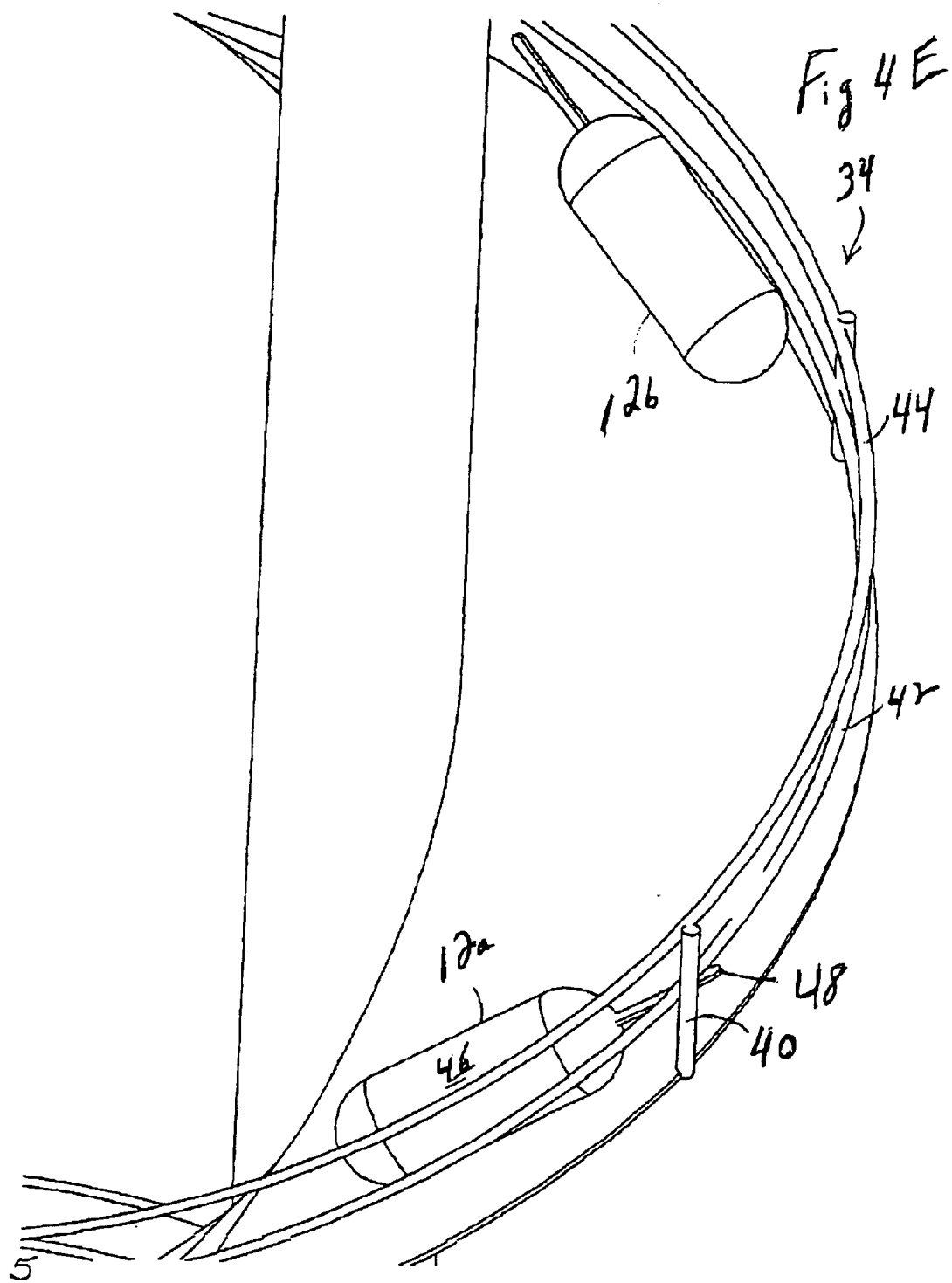

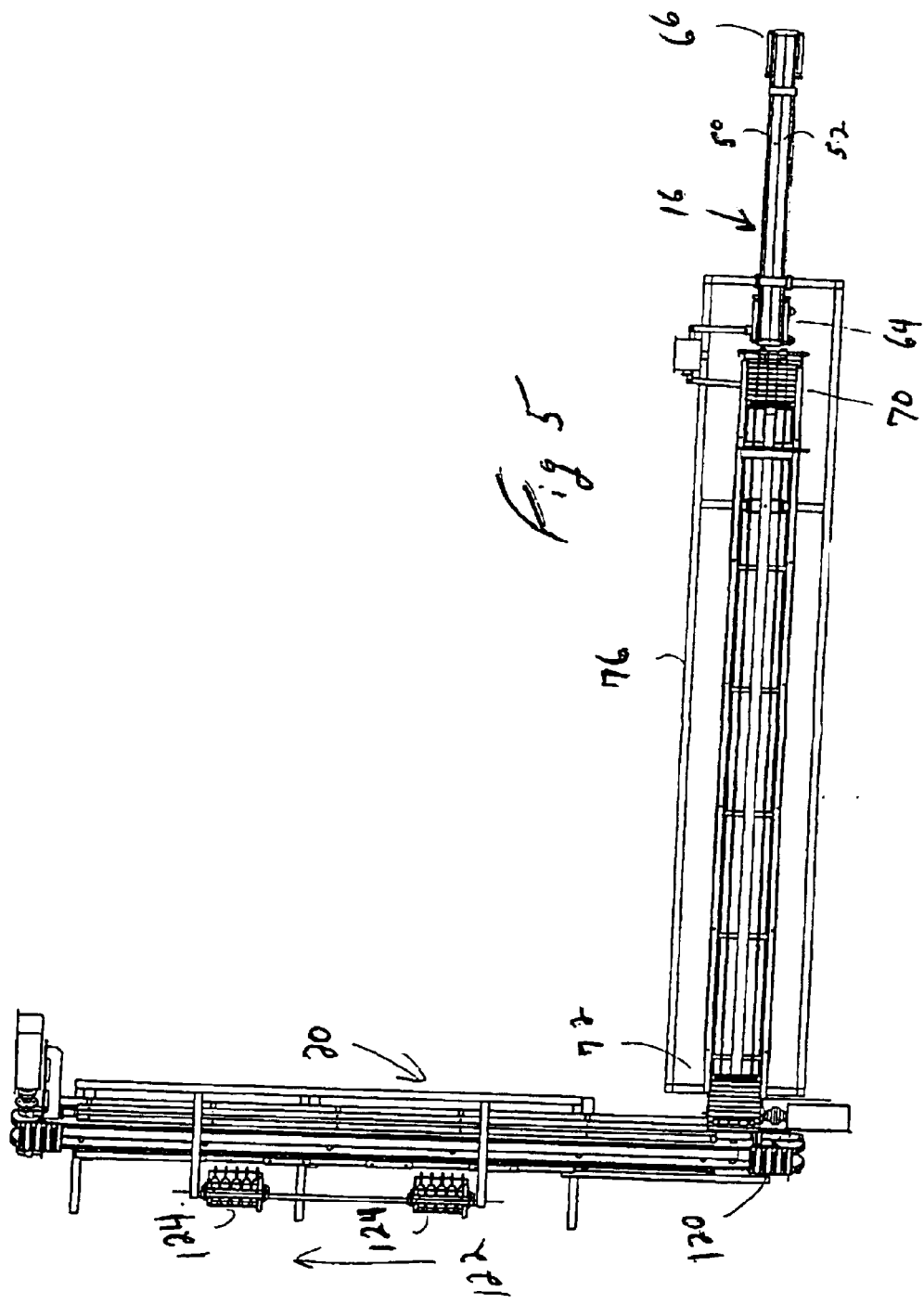

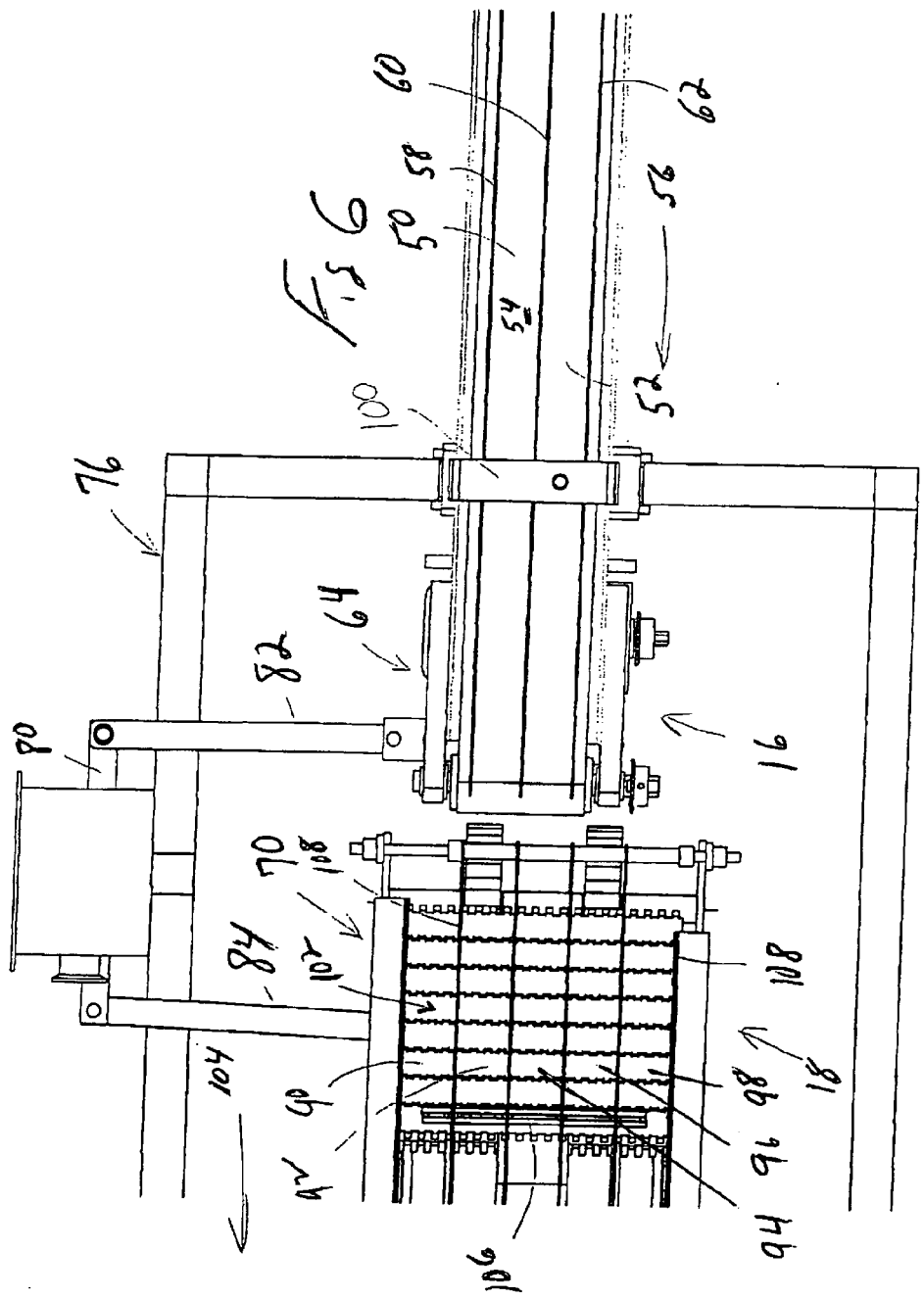

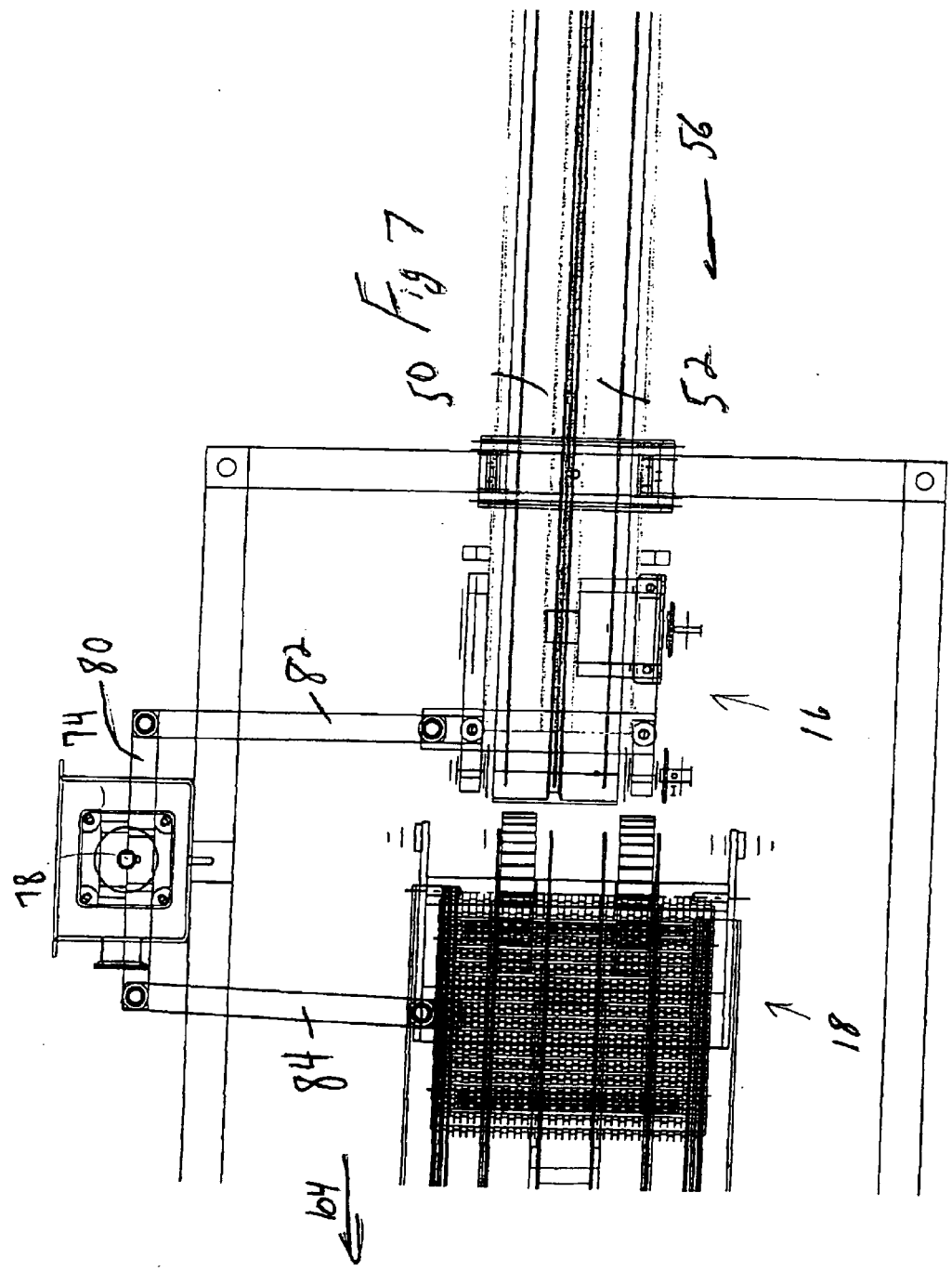

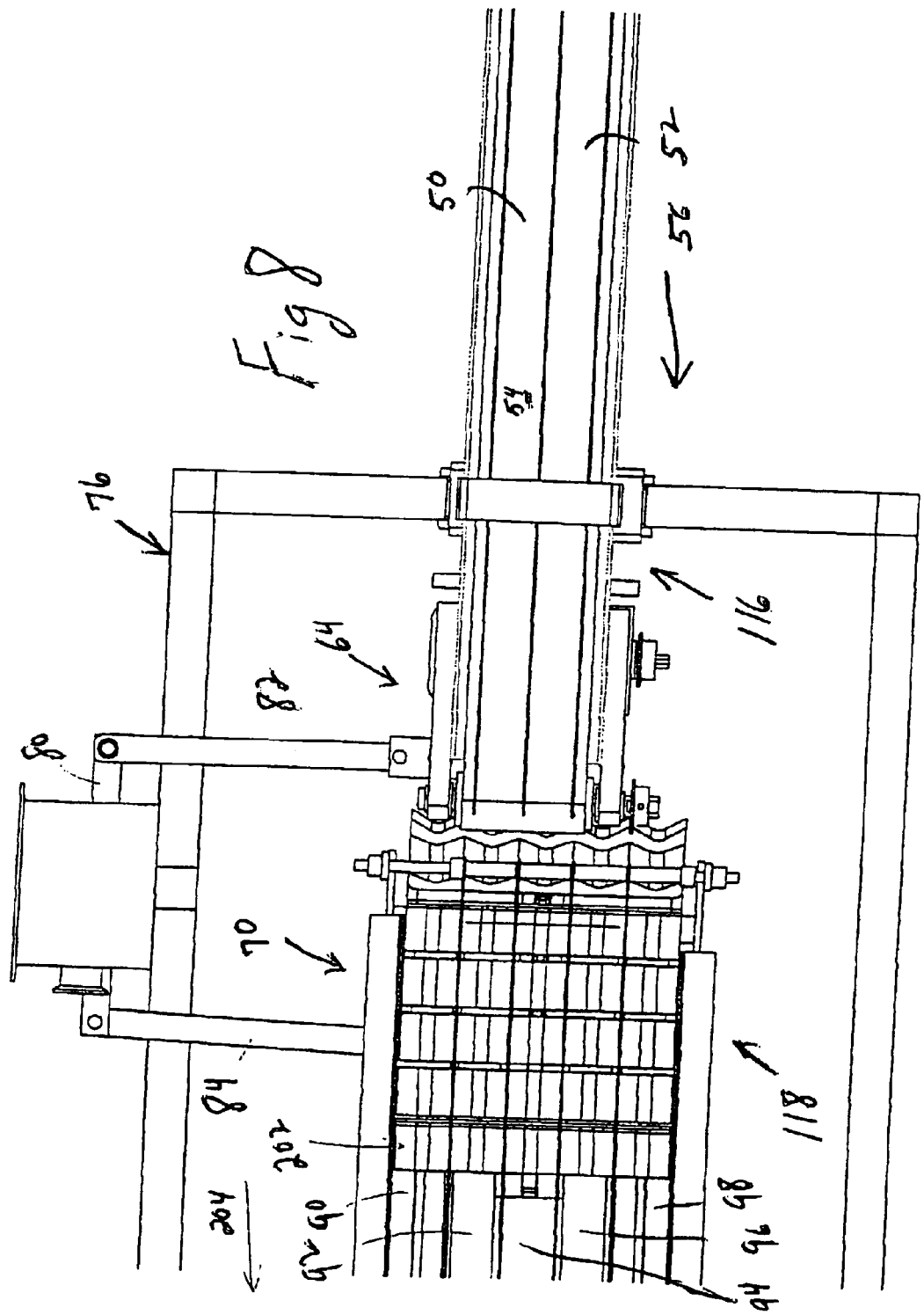

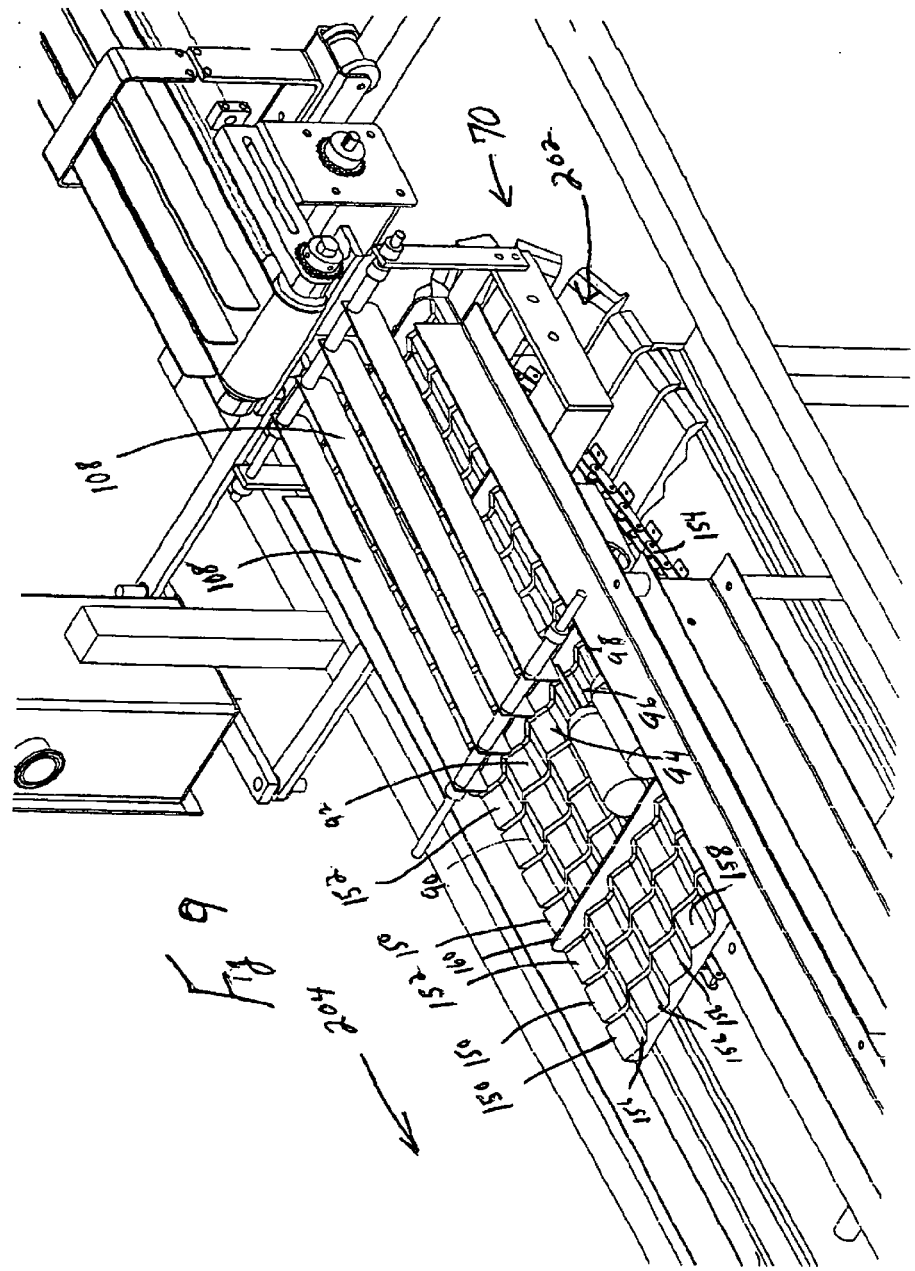

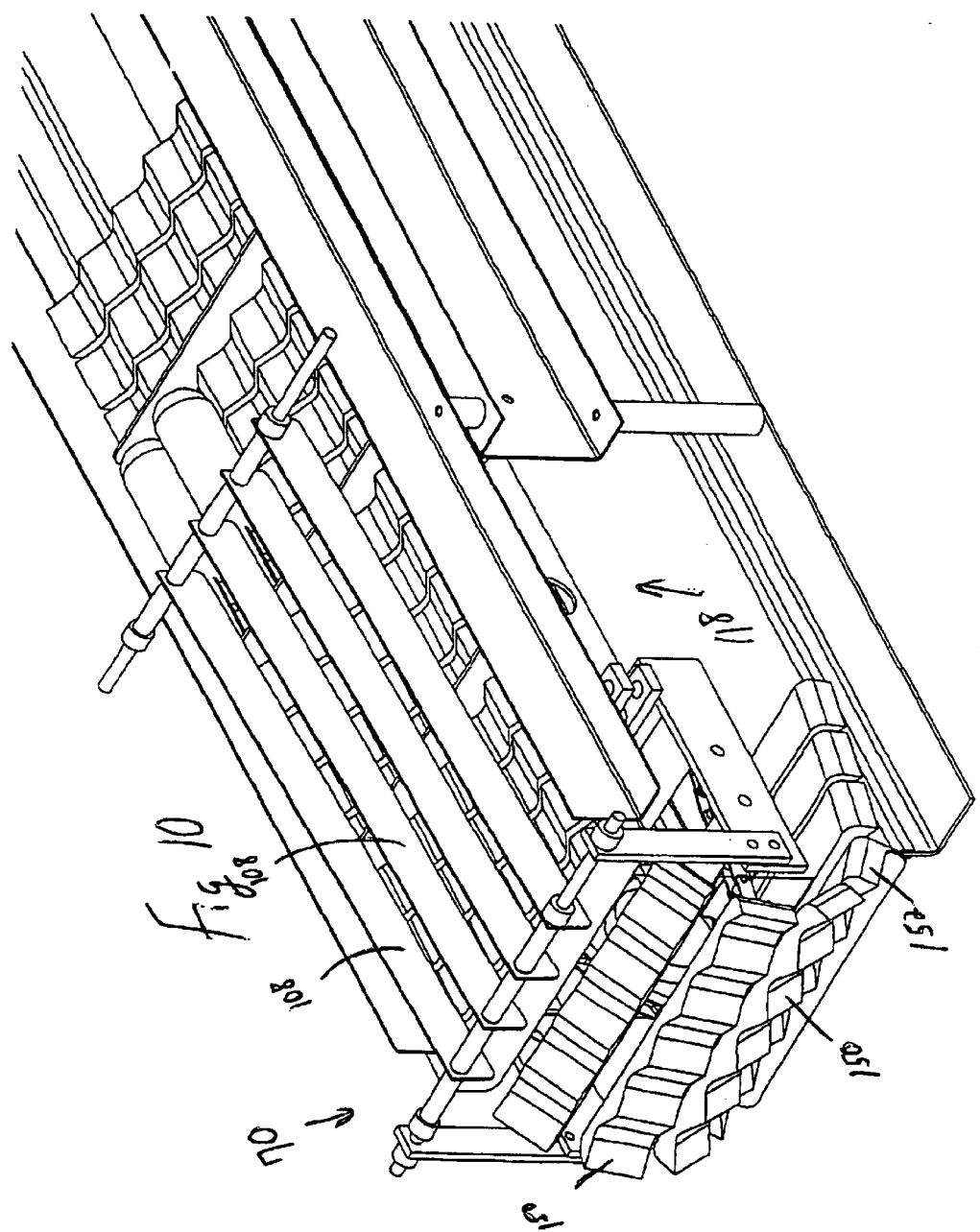

ORIENTING AND SORTING DEVICE FOR CORN DOGS

BACKGROUND OF THE INVENTION

The corn dog is a very popular food item. Typically, the corn dog will have the meat portion formed in a long cylindrical shape like a hot dog with the corn batter on the outer surface thereof. A wooden or plastic stick will be inserted in one end of the meat portion to form a handle to allow the consumer to hold the corn dog while it is being eaten.

In part because of the handle or stick, in the past it has been necessary to orient the corn dog manually on a production line for placement in its packaging. With a relatively heavy, larger diameter meat portion and a relatively light smaller diameter stick, it has been found necessary to use manual labor to properly orient the corn dog moving down a conveyor belt before it is inserted into the packaging for shipment to the vendor or customer.

A need exists to improve the packaging technology for corn dogs to reduce the requirement for manual labor. By automating such a process, the cost of packaging can be significantly reduced. Further, less need for human contact increases the sterility of the packaging process.

SUMMARY OF THE INVENTION

In accordance with one aspect of the present intention, a device for orienting an object is provided. The object has a larger first portion and a second smaller portion. The device includes a spiral slide having a generally vertical center axis and having a floor spiraling about the center axis. The floor has an inner edge proximate the center axis and outer edge spaced from the center axis. The floor supports the object for a descent from a first higher elevation to a second lower elevation. The spiral slide further has orienting structure at the outer edge of the floor. The orienting structure has a plurality of elements to prevent the first larger portion of the object from passing through the orienting structure and sliding off the floor as the object descends and permits the second smaller portion of the object to contact an element as the object descends to spin the object so that the object descends the spiral slide with the first larger portion leading the second smaller portion.

In accordance with another aspect of the present invention, at least one of said plurality of elements is a post. The post extends generally perpendicular the adjacent surface of the floor. In accordance with another aspect of the present invention, a first conveyor is provided which has an inlet end and an outlet end, said first conveyor being pivoted at the inlet end. A second conveyor is provided which has an inlet end and an outlet end, said second conveyor being pivoted at the outlet end. The outlet end of the first conveyor is proximate the inlet end of the second conveyor. Objects oriented in the descent on the spiral slide exit the spiral slide into the inlet end of the first conveyor.

BRIEF DESCRIPTION OF THE DRAWINGS

For a more complete understanding of the present invention and for further advantages thereof, reference is now made to the following Detailed Description, taken in conjunction with the accompanying Drawings, in which:

FIG. 2 is a perspective view of a portion of a spiral slide in the apparatus;

FIG. 3 is a plan view of the spiral slide;

FIG. 5 is a plan view of a first type of conveyors used in the apparatus;

FIG. 6 is a plan view of a portion of the first type of conveyors;

FIG. 7 is another plan view of a portion of the first type of conveyors;

FIG. 8 is a plan view of a second type of conveyors used in the apparatus;

FIG. 9 is a perspective view of a portion of the second type of conveyors; and

FIG. 10 is another perspective view of one of the second type of conveyors.

DETAILED DESCRIPTION

Figure 1:
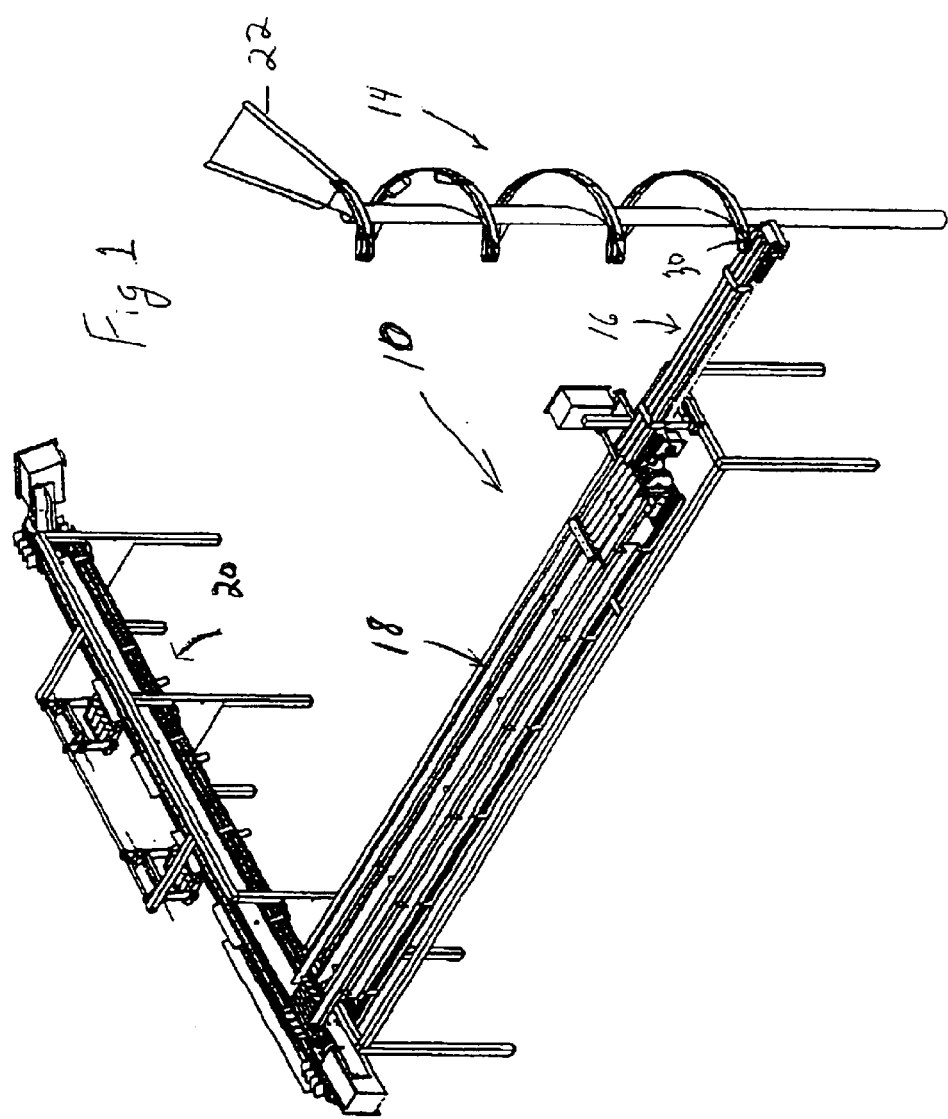
FIG. 1 is a perspective view of an apparatus forming a first embodiment of the present invention for orienting and sorting corn dogs.

With reference now to FIGS. 1–7, an apparatus 10 will be described for orienting and conveying objects such as corn dogs 12 to package the corn dogs for shipment. FIG. 1 illustrates the apparatus 10 to include a spiral slide 14, which accepts corn dogs 12 to be packaged at chute 22, a first conveyor 16, a second conveyor 18 and a loading conveyor 20. The corn dogs 12 entering chute 22 slide down the spiral slide 14 and are oriented in a single direction, as will be described hereinafter. The oriented corn dogs 12 exit the spiral slide 14 onto the first conveyor 16. The first conveyor has a limited number of slots to convey corn dogs, for example 2, while the second conveyor 18 has a larger number of slots, for example 5. The first and second conveyors are pivoted to allow the first conveyor to index any of its slots with any of the slots in the second conveyor 18 so that individual corn dogs at random spacing on the first conveyor are transferred into spaced groups of corn dogs on the second conveyor, as will be described hereinafter. The second conveyor 18 conveys the corn dogs 12 to the loading conveyor 20 where they are loaded in groups into the packaging.

The spiral slide 14 has a center pole 24 which is oriented vertically and centered on a center axis 26. A curved floor 28 spirals downwardly around the center pole 24 from the chute 22 to the exit 30 of the spiral slide 14. The inner edge 32 of the floor 28 is secured to the center pole 24. An orienting structure 34 forming a fence 36 is mounted to the outer edge 38 of the floor 28. The fence 36 is constructed of a series of poles 40 secured to the outer edge 38 of the floor 28 and extending upwardly generally perpendicular the adjacent surface 47 of the floor 28. A spiral lower railing 42 and a spiral upper railing 44 extend the entire length of the spiral slide 14 and are supported by the poles 40. The lower railing 42 extends above the adjacent surface 47 of the floor 28 a predetermined height while the upper railing 44 extends above the lower railing 42 a predetermined height.

The corn dog 12 has an elongated large diameter cylindrical meat portion 46 and an elongated small diameter stick 48 extending from one end of the meat portion 46. As the corn dogs 12 are placed at the top of the spiral slide 14 in the chute 22, the corn dogs 12 can have any orientation. In other words, some corn dogs 12 will have the stick 48 preceding the meat portion 46 in sliding down the spiral slide 14, some corn dogs 12 will have the meat portion 46 preceding the stick 48 and yet other corn dogs 12 will proceed into the spiral slide 14 sideways.

Figure 4A:
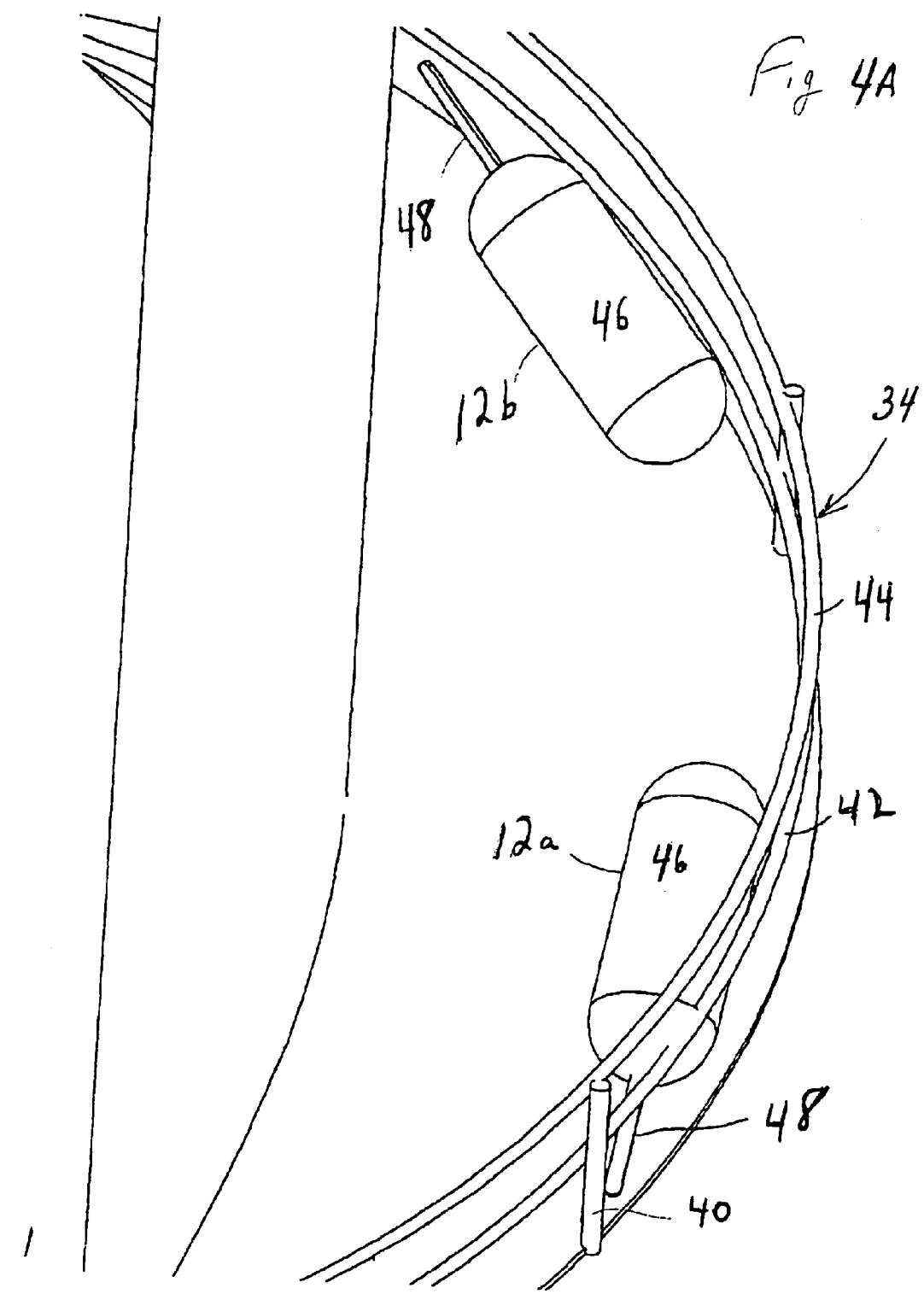
FIGS. 4 A–E illustrates the orientation of a corn dog descending the spiral slide.

FIGS. 4A–E illustrate how the spiral slide 14 insures that all corn dogs 12 are in the same orientation by the time they reach the exit 30, with the meat portion 46 preceding the stick 48. FIG. 4A illustrates a position along spiral slide 14 where one corn dog, a corn dog 12a, is in the improper orientation. Corn dog 12b is already in the proper orientation.

During its slide down the spiral slide 14, the corn dog 12a will eventually be oriented as shown in FIG. 4A so that the stick 48 of the corn dog 12a will contact one of the posts 40. FIG. 4B shows the contact being made. The momentum of the corn dog 12a will cause the corn dog to pivot about the post 40 as seen in FIGS. 4C and 4D. The pivoting motion will cause the meat portion 46 to move ahead of the stick 48 as the corn dog 12a continues its motion downward, forcing it into the proper orientation, as seen in FIG. 4E.

The corn dog 12b, which was properly oriented, will simply ride down the spiral slide 14 as seen in FIGS. 4A–E with the meat portion 46 engaging the rails 42 and 44. Because the meat portion 46 has greater mass than the stick 48, the corn dog 12b will continue to be properly oriented as it slides down the spiral slide 14. Once the corn dog 12a is properly oriented, as seen in FIG. 4E, it will also tend to remain properly oriented just as corn dog 12b. Even if one of the corn dogs moves out of proper orientation, it will likely be reoriented to the correct orientation before it reaches the exit 30 at the bottom of the spiral slide 14.

If the corn dog is placed sideways at the chute 22, as it falls down the spiral slide 14, its inertia will cause it to be flung radially outward from the center axis 26 and into contact with the orienting structure 34. When it contacts the orienting structure 34, it will most likely either be pivoted to the correct orientation or pivoted to the orientation with the stick 48 ahead of the meat portion 46. As noted above with regard to corn dog 12a, this improper orientation will likely be reoriented to the correct orientation before the corn dog reaches the bottom of the spiral slide 14.

As can be appreciated, in traveling down the spiral slide 14, the vast majority, if not all, of the corn dogs will achieve the proper orientation. Clearly, the predetermined distances between the surface 47 and rails 42 and 44 will be chosen to prevent a corn dog 12 from flying through the orienting structure 34 and leaving the spiral slide 14 before reaching the end. However, the rails 42 and 44 must be spaced far enough from floor 28 to prevent a corn dog from flying over the rails and leaving the spiral slide 14 as well. It may be necessary to have more than two rails to achieve this goal.

Once the corn dogs 12 reach the exit 30 of the spiral slide 14, they will glide into either slot 50 or slot 52 of the first conveyor 16 as seen in FIGS. 5–7. The first conveyor 16 has vertical barriers 58, 60 and 62 extending along its length to define the slots 50 and 52. The corn dogs 12 will enter the slots randomly. The exit 30 of the spiral slide 14 converges so that at the point it mates with the first conveyor 16, the width of the exit 30 corresponds to the width of the slots 50 and 52. The first conveyor 16 has a continuously moving belt 54 which moves in the direction of arrow 56. Thus, any corn dog 12 sliding down spiral slide 14 will enter one of the two slots and be moved along the conveyor in the direction of arrow 56 by the moving belt 54.

The first conveyor 16 is mounted on a frame 76 for pivotal motion near the inlet end 66 of the first conveyor. The second conveyor 18 is mounted on frame 76 for pivotal motion near its outlet end 72. The outlet end 64 of a first conveyor 16 is positioned close to and faces the inlet end 70 of the second conveyor 18 as seen in FIGS. 6 and 7. A stepping motor 74 is mounted on frame 76 near the facing ends of conveyors 16 and 18. The driveshaft 78 of the motor 74 is connected to a crossarm 80. A first arm 82 is pivotally connected between the first conveyor 16 at the outlet end 64 and a first end of the crossarm 80. A second arm 84 is pivotally connected between the second conveyor 18 at the inlet end 70 and the other end of the crossarm 80. As the motor 74 moves the driveshaft 78 in either rotational direction, the outlet end 64 of the first conveyor 16 and the inlet end 70 of the second conveyor 18 move relative each other in a direction generally perpendicular the elongate length of the conveyors. In doing so, slots 50 and 52 can be aligned with any of the slots 90–98 in the second conveyor 18. Thus, by using a sensor 100 on the first conveyor 16 which senses when a corn dog 12 is passing, control logic in the apparatus 10 can activate motor 74 to orient the particular slot in the first conveyor 16 in which the corn dog is traveling with an empty slot at the inlet end 70 of the second conveyor 18. Thus, each of the five slots 90–98 in the second conveyor 18 can be filled with a corn dog 12.

The second conveyor 18 has a conveyor belt 102 which is moved in the direction of arrow 104. At predetermined distances along the belt 102 are formed barriers 106 to form a stop for the corn dogs 12 as they are placed on the second conveyor 18. Dividers 108 extend along the entire length of the second conveyor 18 above the belt 102 to define the slots 90–98. Each of the five slots 90–98 at the inlet end 70 of the second conveyor 18 are filled with a corn dog 12. When filled, the belt 102 is moved forward in the direction of arrow 104 a sufficient distance to position the belt 102 to receive the next five dogs from the first conveyor 16.

In a modified arrangement, the first and second conveyor 16 and 18 are replaced by first conveyor 116 and second conveyor 118. Many of the components on conveyors 116 and 118 are the same as in conveyors 16 and 18 and are identified by the same reference numerals. The second conveyor 118 has a conveyor belt 202 which is moved in the direction of arrow 204. The conveyor belt 202 is constructed of special shaped flights 150 and 152 attached to a continuous driven chain 154. Each flight 150 and 152 has a series of valleys 156 machined into the corn dog contacting surface 158 which are aligned along the direction of travel of the belt 202 in the direction of arrow 204. The flights have five valleys 156 across the width of the flights. The valleys are sized to permit a corn dog 12 to nest therein as it is carried by belt 202. The length of four adjacent flights in the direction of motion of the belt 202 is slightly longer than the total length of a corn dog 12. Flights 152 form each fourth flight and have an integral vertical barrier 160 to provide a stop for the corn dogs 12 as they are placed on the second conveyor 118 from the first conveyor 116. Dividers 108 near the inlet end 70 of conveyor 118 help to guide the corn dogs 12 into one of the five slots as they are placed on the second conveyor 118. The corn dogs will naturally drop or roll into the valleys in flights 150 and 152, assuring that the corn dogs 12 are aligned along the direction of movement of the conveyor belt 202. Each of the five slots 90–98 at the inlet end 70 of the second conveyor 118 is filled with a corn dog 12. When filled, the belt 202 is moved forward in the direction of arrow 204 a sufficient distance to position the belt 202 to receive the next five corn dogs from the first conveyor 116.

The belts 102 and 202 will eventually deliver a group of five corn dogs to the outlet end 72 of the second conveyor 18 or 118. Here, the group of five corn dogs will fall by gravity into a holder 120 on the loading conveyor 20. The loading conveyor 20 also moves the holder 120 along the loading conveyor 20 in the direction of arrow 122 until the holder 120 reaches a loading station 124 where the five corn dogs can be loaded into appropriate packaging. As seen, the loading conveyor 20 has two loading stations 124. Clearly, any number of loading stations can be utilized.

As will be appreciated, the apparatus 10 is capable of taking randomly oriented corn dogs 12, orienting them in a uniform orientation and transporting them to loading stations 124 for loading into appropriate packaging. While the corn dogs are randomly spaced as they fall down the spiral slide 14, the conveyors act to position the corn dogs in groups of a set number, such as five. This operation is done virtually automatically, requiring only maintenance to ensure proper operation of the apparatus.

While the present invention has been described with respect to one embodiment illustrated and described herein, it will be understood various changes and modifications will be suggested to one of ordinary skill in the art and it is intended to encompass the changes and modifications as fall within the scope of the invention.

What is claimed is:

1. A device for orienting an object, the object having a first larger portion and a second smaller portion, comprising:
   a spiral slide having a generally vertical center axis and having a floor spiraling about the center axis, said floor having an inner edge proximate the center axis and an outer edge spaced from the center axis, said floor supporting the object for a descent from a first higher elevation to a second lower elevation;
   the spiral slide further having orienting structure at the outer edge of the floor, said orienting structure having a plurality of elements to prevent the first larger portion of the object from passing through the orienting structure to prevent the object from sliding off the floor as the object descends and permitting the second smaller portion of the object to contact an element as the object descends to rotate the object so that the object descends the spiral slide with the first larger portion leading the second smaller portion;
   a first conveyor having an inlet end and an outlet end, the spiral slide having an outlet proximate the inlet end of the first conveyor; and
   a second conveyor having an inlet end and an outlet end, the outlet end of the first conveyor facing the inlet end of the second conveyor, said first conveyor being pivotal about an axis proximate the inlet end of the first conveyor and the second conveyor being pivotal about an axis proximate the outlet end of the second conveyor to permit a selected location on the outlet end of the first conveyor to be aligned with a selected location on the inlet end of the second conveyor.

2. The device of claim 1 further including a frame, a stepping motor mounted on the frame, the stepping motor having a drive shaft, a cross arm mounted on the drive shaft of the stepping motor, a first arm pivotally mounted between a first end of the cross arm and the first conveyor at the outlet end thereof, a second arm pivotally mounted between the opposite end of the cross arm and the second conveyor at the inlet end thereof, rotation of the drive shaft moving the outlet end of the first conveyor relative the inlet end of the second conveyor.

3. The device of claim 1 wherein the first conveyor has a drive belt and at least three dividers to form first and second slots above the drive belt to define two paths for travel of the object along the first conveyor.

4. A system for orienting a corn dog, the corn dog having a first larger portion and a second smaller portion, comprising:
   at least one corn dog having a first larger portion and a second smaller portion;
   a spiral slide having a generally vertical center axis and having a floor spiraling about the center axis, said floor having an inner edge proximate the center axis and an outer edge spaced from the center axis, said floor supporting the corn dog for a descent from a first higher elevation to a second lower elevation;
   the spiral slide further having orienting structure at the outer edge of the floor, said orienting structure having a plurality of elements to prevent the first larger portion of the corn dog from passing through the orienting structure to prevent the corn dog from sliding off the floor as the corn dog descends and permitting the second smaller portion of the corn dog to contact an element as the corn dog descends to rotate the corn dog so that the corn dog descends the spiral slide with the first larger portion leading the second smaller portion.

5. The system of claim 4 wherein the first larger portion of the corn dog is a relatively heavier meat portion of long cylindrical shape and the second smaller portion is a relatively lighter wooden or plastic stick extending from one end of the meat portion.

6. The system of claim 5 further comprising a first corn dog, the first corn dog entering the spiral slide at the first higher elevation oriented with the heavier meat portion leading the stick, the first corn dog maintaining this orientation as the first corn dog descends to the second lower elevation;
   a second corn dog entering the spiral slide at the first higher elevation oriented sideways, the second corn dog being flung radially outwardly from the center axis to contact the orienting structure to rotate the second corn dog so that the heavier meat portion leads the stick as the second corn dog descends to the second lower elevation; and
   a third corn dog entering the spiral slide at the first higher elevation with the lighter stick leading the heavier meat portion, the third corn dog being flung radially outwardly from the center axis to contact the orienting structure to rotate the third corn dog so that the heavier meat portion leads the stick as the third corn dog descends to the second lower elevation.

7. The system of claim 4 further including a first conveyor having an inlet end and an outlet end, the spiral slide having an outlet proximate the inlet end of the first conveyor.

8. The system of claim 7 further including a second conveyor having an inlet end and an outlet end, the outlet end of the first conveyor facing the inlet end of the second conveyor, said first conveyor being pivotal about an axis proximate the inlet end of the first conveyor and the second conveyor being pivotal about an axis proximate the outlet end of the second conveyor to permit a selected location on the outlet end of the first conveyor to be aligned with a selected location on the inlet end of the second conveyor.

9. The system of claim 8 further including a frame, a stepping motor mounted on the frame, the stepping motor having a drive shaft, a cross arm mounted on the drive shaft of the stepping motor, a first arm pivotally mounted between a first end of the cross arm and the first conveyor at the outlet end thereof, a second arm pivotally mounted between the opposite end of the cross arm and the second conveyor at the inlet end thereof, rotation of the drive shaft moving the outlet end of the first conveyor relative the inlet end of the second conveyor.

10. The system of claim 7 wherein the first conveyor has a drive belt and at least three dividers to form first and second slots above the drive belt to define two paths for travel of the object along the first conveyor.

11. The system of claim 4 for orienting unoriented corn dogs, the system further comprising a chute for receiving unoriented corn dogs, the chute directing said unoriented corn dogs to said spiral slide.

12. A method for orienting a corn dog, the corn dog having a first larger portion that is a relatively heavier meat portion of long cylindrical shape and a second smaller portion that is a relatively lighter wooden or plastic stick extending from one end of the meat portion, comprising the steps of:

inserting a first corn dog at the top of a spiral slide so that the first corn dog slides down the spiral slide, the spiral slide having a generally vertical center axis and having a floor spiraling about the center axis, said floor having an inner edge proximate the center axis and an outer edge spaced from the center axis, said floor supporting the corn dog for a descent from a first higher elevation at the top of the spiral slide to a second lower elevation;

orienting the first corn dog so that the heavier meat portion leads the lighter stick at the second lower elevation with orienting structure at the outer edge of the floor, said orienting structure having a plurality of elements to prevent the meat portion of the corn dog from passing through the orienting structure to prevent the corn dog from sliding off the floor as the corn dog descends and permitting the stick of the corn dog to contact an element as the corn dog descends to rotate the corn dog so that the corn dog descends the spiral slide with the heavier meat portion leading the stick.

13. The method of claim 12 wherein the step of orienting the first corn dog includes the steps of maintaining the orientation as the first corn dog descends to the second lower elevation when the first corn dog enters the spiral slide at the first higher elevation oriented with the heavier meat portion leading the stick;

reorienting the first corn dog when the first corn dog enters the spiral slide at the first higher elevation oriented sideways by flinging the first corn dog radially outwardly from the center axis to contact the orienting structure to rotate the first corn dog so that the heavier meat portion leads the stick as the first corn dog descends to the second lower elevation; and reorienting the first corn dog when the first corn dog enters the spiral slide at the first higher elevation with the lighter stick leading the heavier meat portion, the first corn dog being flung radially outwardly from the center axis for the stick to contact a post forming a portion of the orienting structure to pivot the first corn dog about the post so that the heavier meat portion leads the stick as the first corn dog descends to the second lower elevation.

* * * * *